July 17, 1956
G. A. LYON
2,754,942
WHEEL STRUCTURE
Filed Dec. 20, 1951
2 Sheets-Sheet 1
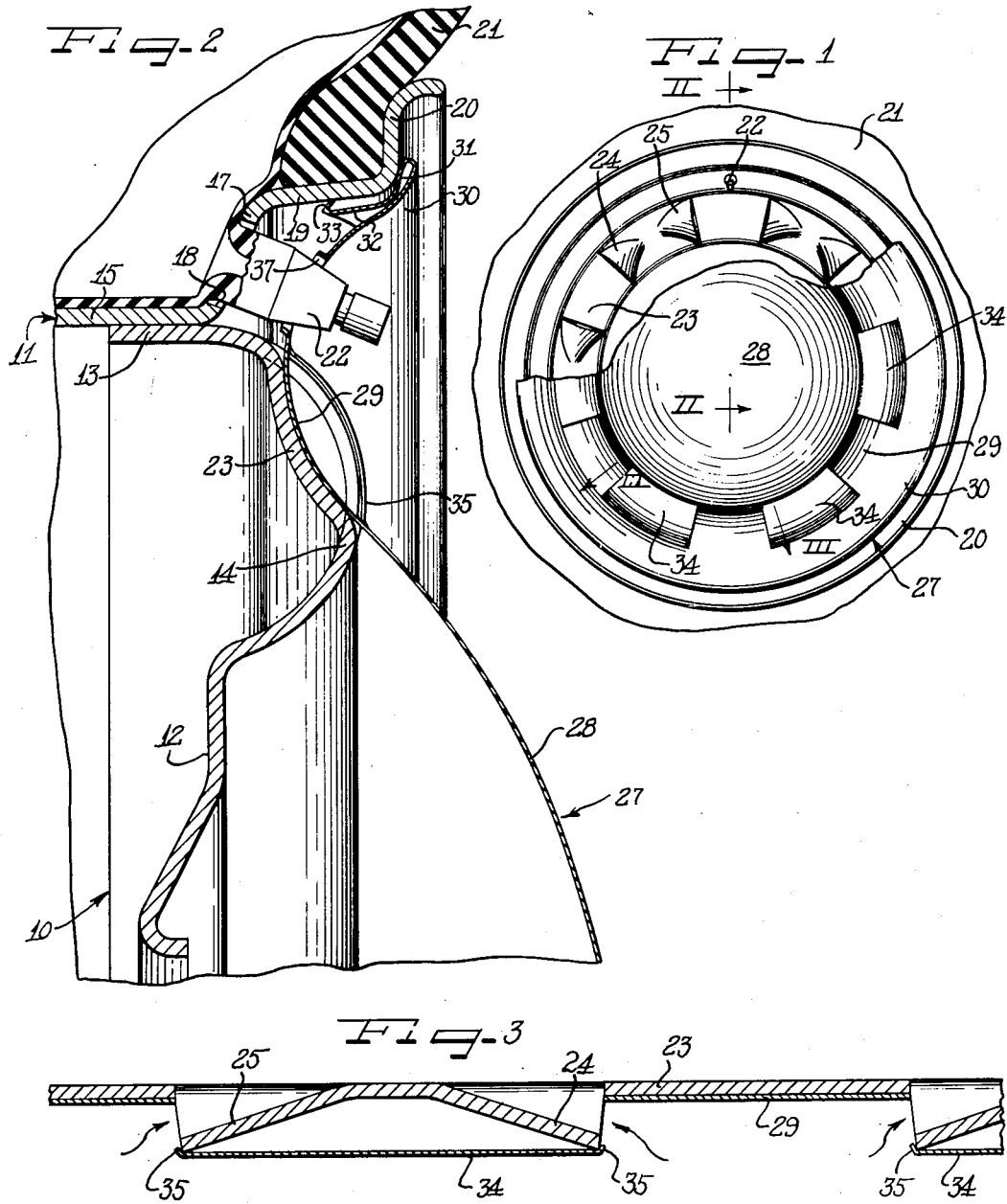
Inventor
George Albert Lyon July 17, 1956 G. A. LYON 2,754,942
WHEEL STRUCTURE
Filed Dec. 20, 1951 2 Sheets-Sheet 2
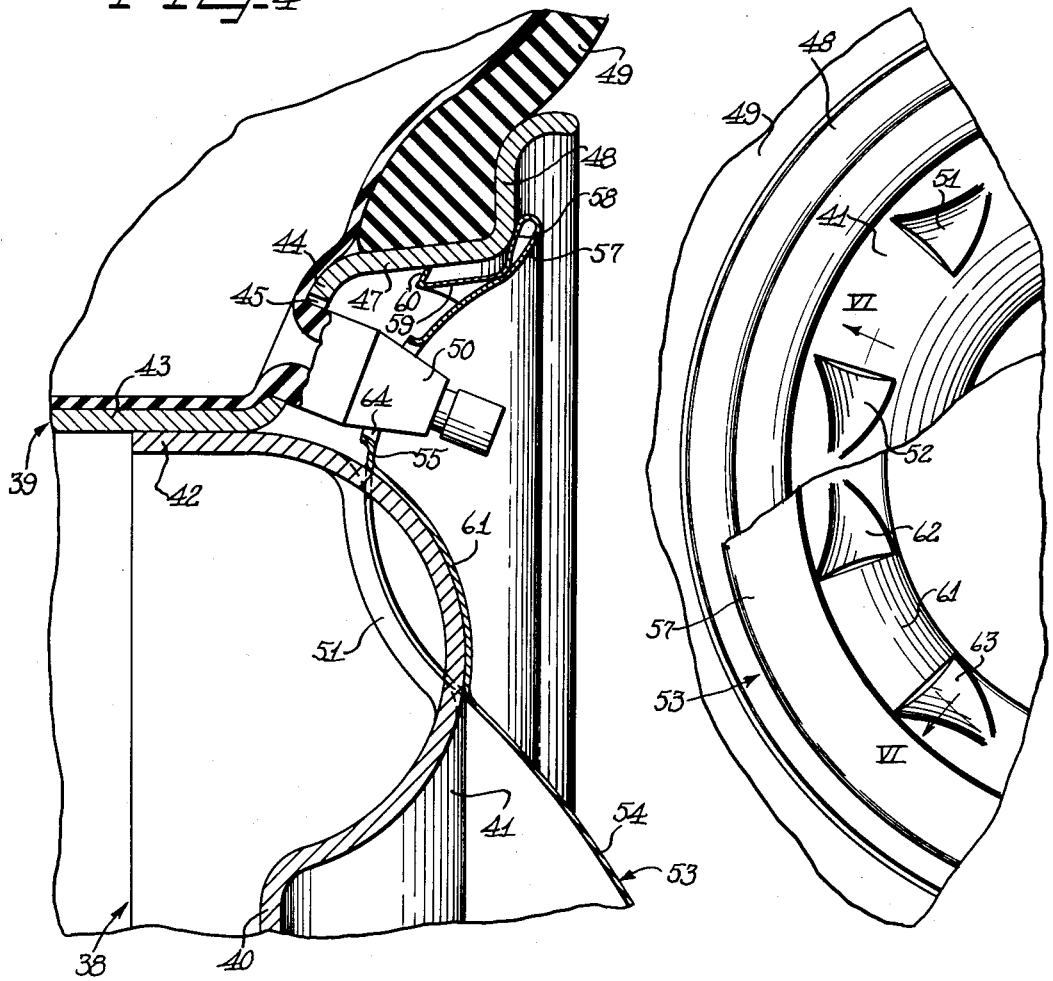
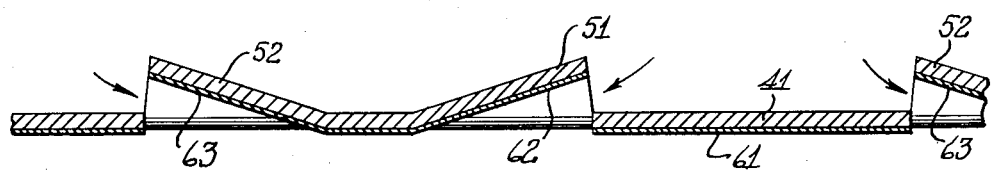
Inventor
George Albert Lyon

United States Patent Office 2,754,942
Patented July 17, 1956

2,754,942
WHEEL STRUCTURE

George Albert Lyon, Detroit, Mich.

Application December 20, 1951, Serial No. 262,534

10 Claims. (Cl. 188—264)

The present invention relates to improvements in wheel structures and more particularly to wheel structures wherein provision is made for circulation of air through the wheel.

A substantial problem is being encountered in the vehicle industry and particularly the automotive branch thereof due to a tendency toward overheating of the more efficient types of brakes being installed and in which the frictional energy absorption results in substantial heating of the brake drums. At the same time, vehicle wheels have currently attained a very small size so that the tire rim rather closely encircles the brake drum. Furthermore, tire sizes have increased so that the spread of the tires substantially shields the area encompassed thereby against free circulation of slip-stream air through such area during operation of the vehicle. This is particularly true during high speed operation of the vehicle in consequence of which use of the brakes causes severe heating of the brake drums.

An important object of the present invention is to provide an improved wheel structure which will provide for circulation of air through the wheel for brake drum cooling purposes.

Another object of the invention is to provide an improved vehicle wheel structure wherein circulation of air can be effected either from the outer side of the wheel inwardly or from the inner side of the wheel outwardly, depending upon vehicle manufacturer preference or structural requirements.

A further object of the invention is to provide a wheel structure having air circulation promoting means and an improved cover for the outer side of the wheel.

Still another object of the invention is to provide an improved wheel structure including a cover therefor and means for retaining the cover against turning on the wheel.

It is still another object of the invention to provide an improved cover for disposition at the outer side of a vehicle wheel.

According to general features of the present invention there is provided in a wheel structure including a tire rim and a disk-type of wheel body, a body having an annular nose bulge portion, said nose bulge portion having alternate oppositely directed louvers pressed therefrom and respectively opening in the opposite directions of rotation of the wheel.

According to other features of the invention, there is provided in a vehicle wheel structure including a tire rim and a wheel body, a cover for the outer side of the wheel including means engageable with the tire rim for holding the cover against axial displacement from the wheel, and means on the cover and on the wheel body interengaging to retain the cover against turning relative to the wheel.

It is another feature of the invention to provide a cover for disposition at the outer side of a vehicle wheel having a body provided with air circulation promoting louver means, a cover body having louver means complementary to and internestable with the louver means of such a wheel body, and means on the cover engageable with the wheel for retaining the cover against axial displacement from the wheel.

Other objects, features and advantages of the present invention will be apparent from the following detailed description of certain preferred embodiments thereof taken in conjunction with the accompanying drawings, in which:

Figure 1 is a side elevational view of a vehicle wheel structure embodying features of the present invention;

Figure 2 is an enlarged radial sectional view taken substantially on the line II—II of Fig. 1;

Figure 3 is a fragmentary enlarged sectional detail view taken substantially in the plane of line III—III of Fig. 1;

Figure 4 is a radial sectional view similar to Fig. 2 but showing a modification;

Figure 5 is a fragmentary front elevational view of the modification of Fig. 4; and Figure 6 is an enlarged fragmentary sectional detail view taken substantially in the plane of line VI—VI of Fig. 5.

As shown on the drawings:

A wheel structure embodying features of the present invention, and as shown in Figs. 1 through 3, comprises a load sustaining wheel body 10 and a tire rim 11 supported concentrically by the wheel body. Both the wheel body and the tire rim may be made from a suitable gauge of sheet metal, the body being stamped and the tire rim being rolled according to well known practices.

The wheel body 10 has a central bolt-on flange 12 and an outer peripheral attachment flange 13, with an intermediate, annular generally axially outwardly projecting reinforcing nose bulge 14.

The tire rim 11 comprises a base flange 15 to which the attachment flange 13 of the wheel body is attached. Generally radially from the base flange extends a side flange 17 having therein a valve hole 18. Directed generally radially and axially outwardly from the side flange is an intermediate flange 19 which merges with a terminal flange 20. The tire rim is of the multi-flange, drop-center type for supporting a pneumatic tire and tube assembly 21, including a valve stem 22 which projects through the valve stem opening 18 in the side flange of the tire rim.

According to the present invention means are provided on the wheel body 10 for promoting circulation of air through the wheel. To this end, the nose bulge intermediate portion 14 of the wheel body is provided at the radially outer side thereof, with a transversely dished annular outwardly opening groove formation 23 of substantial cross-sectional radius. As best seen in Fig. 2, the groove 23 opens axially outwardly and somewhat radially outwardly, that is toward the periphery of the wheel. At uniform intervals, the groove formation 23 has outwardly projecting pairs of oppositely opening louvers 24 and 25, the arrangement being such that in the annular series of louvers alternate ones of the louvers open in opposite respective direction of rotation of the wheel.

As best seen in Figs. 1 and 3, the louvers 24 and 25 are pressed from the material of the wheel body defining the groove 23 and are of generally triangular shape with the mouth portions of the louvers approximately as wide as the extreme width of the groove 23 and extending toward maximum mouth-gap spacing from the bottom of the groove. Each of the louvers tapers toward a trailing end that merges with the bottom of the groove. The trailing end portions of the respective louvers 24 and 25 in each pair of louvers are adjacent, and the mouth ends of the louvers are spaced substantially from the mouth ends of the neighboring and oppositely directed louvers. Through this arrangement, it will be clear that the set of louvers opening in one rotary direction of the wheel will scoop air thereinto and direct the same into the space behind the wheel when the wheel rotates in service in that direction, while the remaining set of louvers, opening in the opposite rotary direction, will scoop in air and direct the same inwardly into the space behind the wheel when the wheel rotates in said opposite direction in service. By having the louvers at the generally radially outer side of the nose bulge 14 assures that the louvers are in the most effective position for capturing and scooping air into the wheel from the surrounding air at the outer side of the wheel and more especially the slip-stream and the air that backwashes from the slip-stream toward the wheel while traveling.

In order to improve the air scooping action of the louvers 24 and 25, and the movement of the scooped-in air toward the inside center of the wheel and thus into effective cooling circulation relative to a brake drum behind the wheel, the louvers are preferably formed conoidally with the radially outer sides having juncture with the wheel body on a convex curvate line directed more or less spirally inwardly. The radially inner sides of the louvers are preferably formed with concave juncture toward convergence with the convex outer curvate sides. Thereby in the rotation of the wheel in either direction, the air scooped in by the proper louvers is directed spirally inwardly toward the associated brake drum.

A cover 27 is provided for the outer side of the wheel and in the present instance comprises a full disk type of cover although in a proper instance the cover may comprise a composite of a trim ring and a central hub cap. In the present instance the cover comprises a central crown portion 28, an intermediate dished annular portion 29 with which the crown merges, and a peripheral portion 30. An underturned marginal flange 31 is adapted to engage the tire rim at or adjacent to juncture of the intermediate flange 19 with the terminal flange 20 and has generally axially inwardly extending retaining fingers 32 thereon provided with short retaining terminal flanges 33 directed generally axially and radially outwardly and engaging under resilient retaining tension against the intermediate flange 19.

By preference the intermediate portion 29 of the cover is formed on a complementary concave curvature to fit in assembly in the groove formation 23 of the wheel body. By preference a snugly nested relationship is provided for as seen in Figs. 2 and 3.

To accommodate the air scooping louvers 24 and 25, the annular intermediate portion 29 of the cover is provided at appropriate intervals, over each pair of the louvers 24 and 25, with a complementary convexly cross-sectioned hood protuberance 34 for concealingly overlying one of the respective pairs of louvers. As viewed from the outer side, the cover is thus provided with a uniform annular series of equally spaced ones of the generally arcuate hood portions 34 and intervening concave portions. To provide a finishing edge each end of the respective hood portions 34 is formed with an inturned finishing flange 35 engaging the edge of the subjacent louver.

As best seen in Fig. 3, the mouth ends of the louvers 24 and 25 are formed on outwardly flaring angles so that the space between the outer or peak portions of the mouth ends of opposing louvers are spaced apart to a greater distance than the inner or juncture portions of the louver edges. This facilitates assembly and registration of the sections of the intermediate cover portion 29 between the edges of the louvers. By proper dimensioning of the intermediate sections of the portion 29 the edges thereof will fairly closely engage or at least approach the adjacent edges of the louvers and thus retain the cover against turning on the wheel by the interengagement of the contiguous louver and cover edges.

Application of the cover to the wheel is accomplished by registering the hoods 34 over the pairs of louvers and registering the intervening sections of the intermediate portion 29 of the cover within the gaps or spaces between opposing louver edges and then pressing the cover home so that the retaining fingers 32 enter into retaining gripping engagement with the tire rim intermediate flange 19 and the hoods 34 and the intervening depressed sections of the cover portion 29 come to rest in proper relation to the louvers. Removal of the cover is accomplished by prying the same free from the wheel by inserting a pry-off tool behind the bead-like reinforced outer periphery of the cover.

A valve stem aperture 37 is provided in the radially outer portion of the cover properly disposed to receive the valve stem 22 therethrough.

Under circumstances where it is desired to have air circulate from the inside of the wheel outwardly, the construction shown in Figs. 4, 5 and 6 may be used. In this form of the invention a wheel comprising a wheel body 38 and a tire rim 39 is in general constructed much the same as the wheel of Figs. 1 and 2. To this end, the wheel body 38 includes a central bolt-on flange 40, an intermediate annular reinforcing nose bulge 41 and a peripheral attachment flange 42. The attachment flange is secured to a base flange 43 on the tire rim. Extending generally radially outwardly from the base flange is a side flange 44 having a valve stem aperture 45. An intermediate flange 47 extends generally axially and radially outwardly from juncture with the side flange and merges with a terminal flange 48. The tire rim supports a pneumatic tire and tube assembly 49 having a valve stem 50 projecting through the valve stem hole 45 in the tire rim side flange.

To provide for circulation of air from the inside of the wheel outwardly, the radially outer side of the nose bulge 41 of the wheel body is formed with a plurality of inwardly directed or pressed in louvers preferably provided in oppositely directed pairs of louvers 51 and 52. Each pair of the louvers 51 and 52 is preferably of generally conoidal form with the apices thereof adjacent and with the mouth portions flaring in respectively opposite directions so as to scoop air from inside the wheel and direct the same toward the outer side of the wheel, in other words in an exhausting relation to the inside of the wheel. To facilitate the expelling or exhausting action, the louvers are, as best seen in Fig. 5, formed with the radially inner sides thereof on respective curvate outwardly spiraling direction from the mouth to the apex ends of the louvers. Furthermore, the radially outer sides of the louvers preferably have the sides thereof concavely formed to complement and cooperate with the radially inner sides in directing the air not only toward the outer side of the wheel but also toward the periphery of the wheel as the wheel rotates in service.

For covering the outer side of the wheel, a cover 53 is provided which may be a full disk cover comprising a circular body including a crown portion 54, a generally dished intermediate annular portion 55 and a peripheral or marginal portion 57. The latter has an underturned flange 58 provided with means for retaining the cover on the wheel comprising a series of generally axially inwardly extending resilient retaining fingers 59 having terminal flanges 60 extending generally axially and radially outwardly to retainingly engage the intermediate flange 47 of the tire rim.

The intermediate portion 55 of the cover has an annular radially inner part thereof convexly rib-shaped as shown at 61 to engage snugly with the radially outer portion of the nose bulge 41 in the annular area of the nose bulge having the louvers 51 and 52. To accommodate the louvers 51 and 52, the rib portion 61 of the cover is formed with complementary pressed-in louver portions 62 and 63 which internest within the louvers of the wheel body and therewith define louver mouths for movement of air into and through the louvers as generally indicated by the directional arrows in Fig. 6, depending upon the direction of rotation of the wheel in service.

It will be observed from Figs. 5 and 6 that the mouth edges of the louvers 51 and 52 of the wheel body and of the corresponding louvers 62 and 63 of the cover are tapered generally axially inwardly so that adequate clearance is afforded for passage of the edges defining the cover louvers into the depressions afforded by the wheel body louvers at the edges of the wheel body nose portion at the louver mouths. On the other hand, the juncture portion at the sides of the cover louvers 62 and 63 closely adjoin or engage the edges of the nose portion so that the cover is held against turning on the wheel.

It will be observed that the intermediate portion 55 of the cover is provided with a valve stem hole 64 through which the valve stem 50 projects when the cover is on the wheel.

Application and removal of the cover 53 is accomplished similarly as described in connection with the cover 27. In applying the cover 53 the louver portions 62 and 63 thereof are registered with the louvers 51 and 52 and the cover then pressed home on the wheel until the sections of the rib 61 engage the portions of the wheel body nose 41 intermediate the louvers, and the louvers 62 and 63 nest within the body louvers 51 and 52 respectively of the wheel. Removal of the cover is effected by prying the same from the wheel by inserting a pry-off tool beneath the marginal bead of the cover and prying the same from the wheel.

It will be understood that modifications and variations may be effected without departing from the scope of the novel concepts of the present invention.

I claim as my invention:

1. In a wheel structure including a tire rim and a body portion having an annular nose portion projecting generally axially outwardly in spaced relation to the tire rim, said nose portion having an annular concave groove therein, said groove having louvers projecting therefrom and opening in a direction of rotation of the wheel, a cover for the outer side of the wheel having a portion nested in said groove and including sections thereof complementary to said louvers nested over the louvers and affording openings registering with the openings from the louvers.

2. In a wheel structure including a tire rim and a wheel body having an annular projecting nose portion, a cover for the outer side of the wheel including a portion complementary to and nesting on the nose bulge of the wheel body, said wheel body and the cover having complementary inwardly directed internested louvers opening toward the inside of the wheel.

3. In a wheel structure including a wheel body having an annular series of respectively oppositely directed louvers, a cover for the outer side of the wheel including portions engaging the wheel body between said louvers and having openings therefrom registering with the louver openings.

4. In a wheel structure including a wheel body having an annular series of respectively oppositely directed louvers, a cover for the outer side of the wheel including portions engaging the wheel body between said louvers and having openings therefrom registering with the louver openings, said cover having portions thereof overlying and concealing the louvers.

5. A cover for disposition at the outer side of a vehicle wheel having a body provided with air circulation promoting louver means, a cover body having louver means complementary to and internestable with the louver means of such a wheel body, and means engageable with the wheel for retaining the cover against axial displacement from the wheel.

6. In a wheel structure including a tire rim and a disk spider wheel body having an annular portion thereof radially inwardly from the tire rim, said annular portion being of transversely dished form and having portions thereof at circumferentially spaced areas separated along transverse lines and dished in the opposite direction from the dishing of the annular portion, thereby providing air circulation openings through the wheel body opening circumferentially of the wheel between the oppositely dished portions of said annular portion.

7. In a wheel structure including a tire rim and a disk spider wheel body having an annular portion thereof radially inwardly from the tire rim, said annular portion being of transversely dished form and having portions thereof at circumferentially spaced areas separated along transverse lines and dished in the opposite direction from the dishing of the annular portion, thereby providing air circulation openings through the wheel body opening circumferentially of the wheel between the oppositely dished portions of said annular portion, and a cover for disposition at the outer side of the wheel having an annular portion provided with oppositely dished circumferentially spaced portions complementary to and concealingly internesting with the oppositely dished portions of the annular portion of the wheel body.

8. In a wheel structure including a tire rim and a disk spider wheel body having an annular portion thereof radially inwardly from the tire rim, said annular portion being of transversely dished form and having portions thereof at circumferentially spaced areas separated along transverse lines and dished in the opposite direction from the dishing of the annular portion, thereby providing air circulation openings through the wheel body opening circumferentially of the wheel between the oppositely dished portions of said annular portion, and a cover for disposition at the outer side of the wheel having an annular portion provided with oppositely dished circumferentially spaced portions complementary to and concealingly internesting with the oppositely dished portions of the annular portion of the wheel body, the oppositely dished portions of the cover having openings therein registering with the openings in the wheel body and with axially inwardly directed flanges at the edges of at least certain of the dished portions of the cover overlapping in finishing and substantially concealing relation the edges defining the dished portions of the wheel body with which internested.

9. In a wheel structure including a disk spider wheel body provided with an annular area having an annular series of alternately oppositely dished portions separated along generally radial lines and providing circumferentially opening air circulating apertures in the wheel body, a cover for disposition at the outer side of the wheel having an annular area provided with complementary dished portions internestingly cooperable with the dished portions of the wheel body and having openings therein complementary to the wheel openings, and means behind the cover for retaining the same in separable assembled relation with the wheel.

10. In a wheel structure including a wheel body having a series of louvers therein directed to open circumferentially of the wheel, a cover for the outer side of the wheel having air passage portions engaging said wheel body louvers and provided with openings therein generally complementary to and registering with the louver openings.

References Cited in the file of this patent

UNITED STATES PATENTS

| Number | Name | Date |
|---|---|---|
| D. 103,682 | Kerr | Mar. 23, 1937 |
| 1,665,437 | Booth | Apr. 10, 1928 |
| 1,937,051 | Zerk | Nov. 28, 1933 |
| 2,076,789 | Le Jeune | Apr. 13, 1937 |
| 2,101,923 | Stough | Dec. 14, 1937 |
| 2,113,541 | Blank | Apr. 5, 1938 |
| 2,130,207 | Van Halteren | Sept. 13, 1938 |
| 2,143,950 | Kliesrath | Jan. 17, 1939 |
| 2,231,931 | Lyon | Feb. 18, 1941 |
| 2,331,259 | Whitten | Oct. 5, 1943 |